Sept. 20, 1938.   R. H. SMITH   2,130,970
FURROW DAMMING IMPLEMENT
Filed Oct. 6, 1936
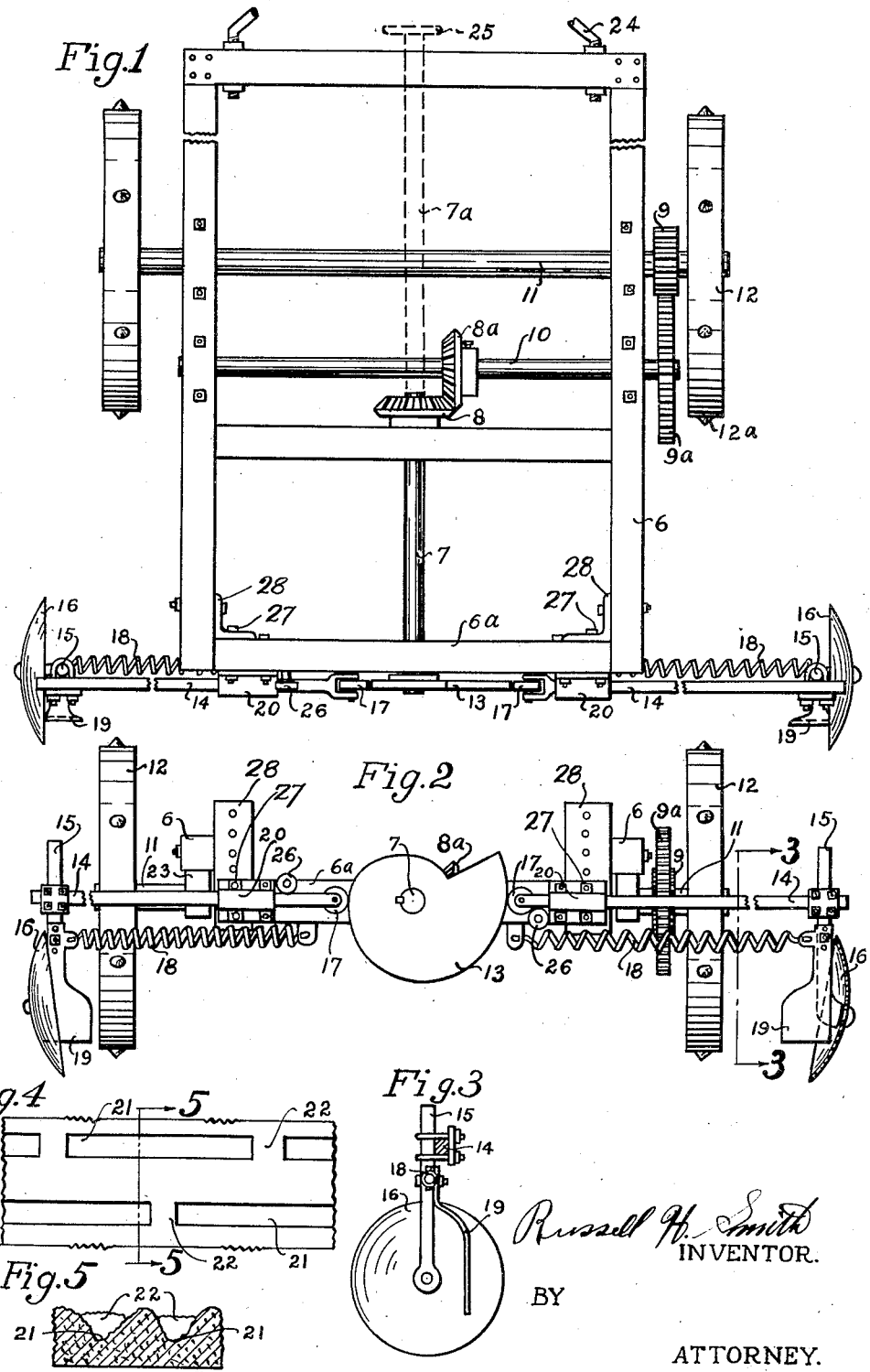

Patented Sept. 20, 1938

2,130,970

UNITED STATES PATENT OFFICE 2,130,970

FURROW DAMMING IMPLEMENT

Russell H. Smith, Quanah, Tex.

Application October 6, 1936, Serial No. 104,243

5 Claims. (Cl. 97—55)

This invention relates to improvements in furrow damming implements adapted to be drawn across a field behind a tractor, lister, planter or analogous soil cultivating implement.

The purpose of this implement is to provide a simple machine that will dam furrows at predetermined intervals, thus providing basins for the trapping and retention of moisture.

An object of this invention is to provide a machine that may be used in conjunction with another agricultural implement without conflicting with the normal operation of such implement.

Another object of this invention is to provide a machine that is adjustable to form dams in furrows of varying widths, and that may be adjusted to form dams that vary in size.

Still another object of this invention is to provide a machine for damming furrows, the drive of which may be self contained on the machine, or by minor alterations, may be adapted to be driven from the power take-off of a tractor.

Yet another object of this invention is to provide a machine that may be operated along with other implements of cultivation, and thus save the time of a separate operation.

With the foregoing objects in mind and others that will become apparent as the description proceeds, reference is to be had to the drawing which illustrates a preferred embodiment of the invention, but it is to be understood that in adapting the same to meet specific needs and requirements, the design may be varied and changes in the minor details of construction resorted to within the scope of the invention as claimed without departing from the spirit thereof.

For a full understanding of the invention and the merits thereof, reference is to be had to the following description and the drawing hereto attached in which:

Figure 1 is a plan view of the invention.

Figure 2 shows a rear elevation of the invention.

Figure 3 is a section taken on the line 3—3 of Figure 2.

Figure 4 is a diagrammatic view of the furrows and dams formed by the machine.

Figure 5 is a section taken on the line 5—5 of Figure 4.

With more detailed reference to the drawing in which like reference characters designate like parts in the several views, the numeral 6 represents the frame of the machine; a shaft 7 is mounted upon the frame 6 and is driven either by means of suitable gearings 8 and 8a and 9a and 9 mounted respectively on shaft 10 and axle 11, and a suitable ground engaging wheel 12 may be affixed to axle 11 to provide a source of power, or the shaft 7 may be coupled directly to the power takeoff of a tractor by an extended shaft as shown by 7a in dotted outline.

A cam 13 is secured to shaft 7 and upon rotation provides means for pushing plungers 14 outward as the machine moves across the field. Plungers 14 are mounted in guides 20 which provide for a straight line horizontal movement of the plungers. Plungers 14 carry arms 15 at the outer ends thereof upon which arms suitable scrapers, such as discs 16 are mounted. Upon rotation of the cam 13 the plungers 14, carrying rollers 17 at the inner ends thereof in engagement with cam 13, are moved outwardly by the cam 13 to the highest point on the cam where a direct drop-off permits each plunger alternately to be moved inwardly instantly by a spring 18 to its innermost point. The springs 18 are connected between end member 6a of the frame and projections 19 attached to arms 15. This operation permits the disc 16 to move a quantity of dirt from the side of the furrow to form a dam across the furrow. The projection 19 cooperates with disc 16 on its inward movement to retain the dirt in the desired deposited position. The projection 19 is normally adjusted to slightly clear the top of the ground, except on the inward movement of the plunger 14.

Arms 15 are adapted to be adjusted vertically in order to secure the proper depth to the scraper and they may also be adjusted horizontally on plunger 14 to vary the width of the furrows. End member 6a of the frame 6 is also adjustably connected by bolts 27 to brackets 28 of the frame 6 so as to provide the best working conditions.

If the machine is used independently of a tractor, ground engaging wheels 12 having lugs 12a rotate shaft 11 as the machine progresses across the field. A gear 9 is secured to shaft 11 and meshes with gear 9a which, in turn, is secured to shaft 10 thereby rotating bevel gear 8a which meshes with gear 8 that is attached to shaft 7. Upon rotation of shaft 7 cam 13 alternately pushes plungers 14 outward. The scraper 16 is in engagement with the ground at all times and, as in the case of a disc, is rolled along with the movement of the machine until such time as the peak of the cam is reached, then the spring 18 draws the plunger inward instantly, thereby forming a dam in the furrow.

The axle 11 and shaft 10 are mounted in suitable bearings such as 23 which are attached to the under side of the frame 6. A suitable draw bar 24 is provided so that the machine may be attached to such implement as occasion demands or the frame 6 may be attached directly to the implement; if a tractor is utilized, extension shaft 7a is attached to the power takeoff of the tractor by coupling 25. To relieve side thrust friction on each plunger 14 due to rotation of the cam 13 a roller 26 is provided on the side opposite the direction of rotation of the cam.

Figure 4 shows a diagrammatic view of the dams formed by this implement. The numeral 21 represents the furrows and 22 the dams as formed therein. During a rain, water is trapped in the basins thus formed in the furrows, thereby providing means for the retention of moisture and the prevention of soil erosion due to washing that would take place in unobstructed furrows. When furrows are unobstructed water either washes away the top soil or causes the light fertile soil to be separated out and deposited on the surface to be blown away by the wind. Thus, by the use of the furrow damming implement the valuable and fertile top soil is conserved and the crop benefitted by the additional moisture.

Having thus described the invention, what is claimed is:

1. A furrow forming machine of the character specified comprising a frame, a plunger carrying a disc scraper slidably mounted on the frame and having a coacting projection connected therewith, means for horizontally moving the scraper outwardly, and means for effecting the quick return of the scraper so that it moves a portion of earth across the furrow to form a dam.

2. A furrow forming machine of the character specified comprising a frame having a rear frame member, a plunger carrying a disc scraper slidably mounted on the frame and having a coacting projection connected therewith, means for horizontally moving the scraper outwardly, means for effecting the quick return of the scraper so that it may draw a portion of earth across the furrow to form a dam, and vertical adjustment means for rear frame member relative to the frame.

3. In a furrow forming machine of the character described, the combination of a frame, a plunger carrying a scraper and mounted on the frame for outward and inward movement, said scraper having an inward projection coacting therewith.

4. In a furrow forming machine of the character described, the combination of a frame, a plunger carrying a scraper and mounted on the frame for outward and inward movement, operating means for said plunger, and an upright projection extending inwardly from said scraper and coacting therewith.

5. In a furrow forming machine of the character described, the combination of a frame, a plunger operatively mounted on the frame, operating means for the plunger, a disc scraper journaled on the plunger for movement therewith, and an inward projection coacting with said disc scraper.

RUSSELL H. SMITH.